H. J. ROBINSON.
SEED-PLANTER.

No. 188,957. Patented March 27, 1877.

WITNESSES:
E. Wolff
J. H. Scarborough

INVENTOR:
H. J. Robinson
BY
ATTORNEYS.

UNITED STATES PATENT OFFICE.

HARVEY J. ROBINSON, OF CARPENTERIA, CALIFORNIA.

IMPROVEMENT IN SEED-PLANTERS.

Specification forming part of Letters Patent No. 188,957, dated March 27, 1877; application filed November 4, 1876.

*To all whom it may concern:*

Figure 1:
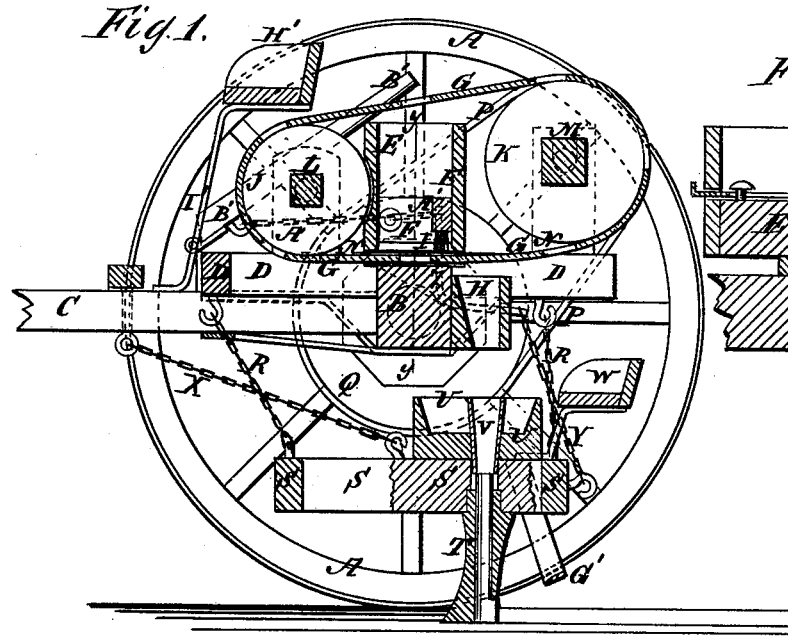
Figure 4:
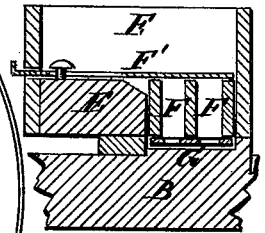
Figure 2:
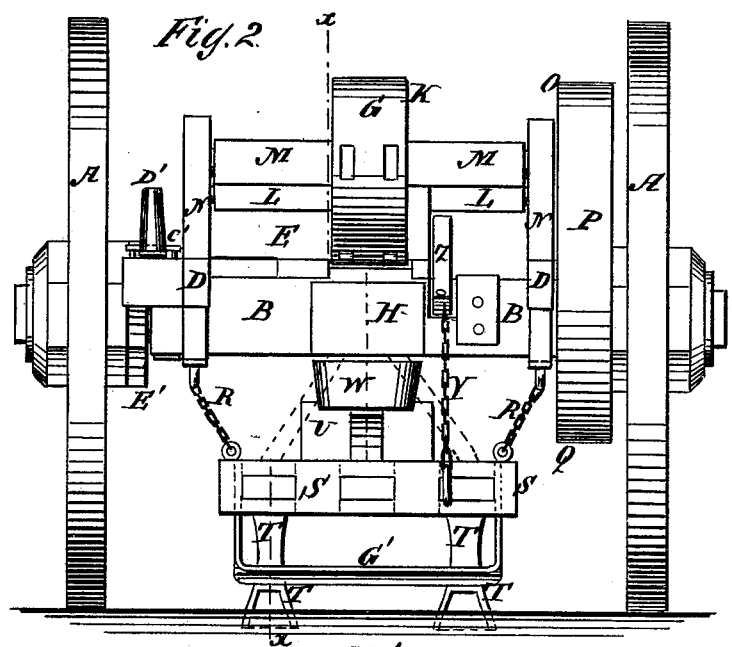
Figure 3:
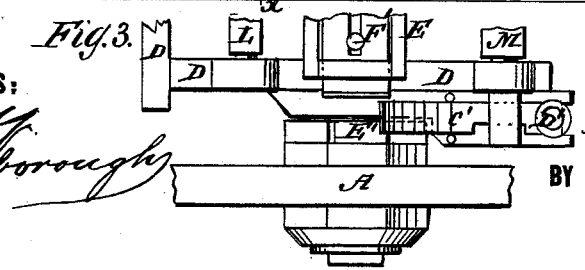

Be it known that I, HARVEY JUDSON ROBINSON, of Carpenteria, in the county of Santa Barbara and State of California, have invented a new and useful Improvement in Seed-Planters, of which the following is a specification:

Figure 1 is a longitudinal section of my improved planter, taken through the line $x\ x$, Fig. 2. Fig. 2 is a rear view of the same. Fig. 3 is a detail top view of the space-indicating device. Fig. 4 is a detail section of the seed-box, taken through the line $y\ y$, Fig. 1.

Similar letters of reference indicate corresponding parts.

The object of this invention is to furnish an improved machine for planting potatoes, corn, and other seeds, which shall be so constructed as to plant the seed so deep as to be beneath the dry soil so that it may have sufficient moisture to make it grow, which will prevent the moist and dry soil from becoming mixed, and which will cut off any weeds that may be growing upon the land being or to be planted.

The invention will first be described in connection with the drawing, and then pointed out in the claim.

A are the wheels, which revolve upon the journals of the axle B. To the axle B is attached the tongue C and the frame D. To the axle B and the frame D is attached the seed-box E, which is used when planting corn and other small seeds. In the bottom of the seed-box E are formed holes or cups F, through which the seed passes to the endless belt G, by which it is carried out and dropped into the spouts H attached to the rear side of the axle B. As many holes or cups F and spouts H are used as it is designed to plant rows at a time. The belt G is prevented from carrying out any more seed than enough to fill the holes formed in it by brushes I attached to the cups F or box E. The belt G passes around the pulleys J K attached to the shafts L M, in front and rear of the seed-box E. The shafts L M revolve in bearings in studs N, attached to the side bars of the frame D. One end of the rear shaft M projects, and to it is attached a pulley, O, around which passes an endless belt, P, which also passes around a pulley, Q, attached to one of the drive-wheels A, so that the seed may be dropped by the advance of the machine.

To the frame D, at or near its four corners, are attached the upper ends of four chains, R, the lower ends of which are attached to the four corners of the frame S. The frame S consists of three longitudinal bars connected at their ends by cross-bars, the side bars being at a distance apart equal to the required distance apart of the rows.

In each of the longitudinal bars of the frame S, toward its rear end, is formed a hole to receive the hollow standards or shanks of the plows T, by which the soil is opened to receive the seed, the said hollows being made of such a size as to allow potatoes to drop through them freely. The seed is conducted to the hollow plow-standards T from the spouts H by rubber tubes, as indicated by the dotted lines in Fig. 2. For planting potatoes the plows T are detached, and one of them is attached to the center bar of the frame S. A box, U, to receive the potatoes is secured to the said center bar and a tube, V, is inserted through a hole in the bottom of the box U, into the hole in the center bar of the frame S.

To the rear end of the frame S is attached a seat, W, for the attendant, who picks up the potatoes from the box U and drops them through the tube V at the proper time. By this construction, by lengthening and shortening the chains R the seed may be deposited in the moist soil, however deep the dry soil may be. The frame S and its attachments are drawn by a chain, X, the rear end of which is attached to the middle part of the said frame S, and its forward end is attached to the tongue C. To the rear end of the frame S is attached the lower end of a chain, Y, the upper end of which is attached to the end of the bent lever Z. The lever Z is pivoted at its angle to the axle B, and to its other end is attached the rear end of the chain A'. The forward end of the chain A' is attached to a hand-lever, B', the lower end of which is hinged to the front cross-bar of the frame D.

Upon a side bar of the frame D, or upon a block attached to said side bar, is placed a slide, C', which has a handle, D', attached to its rear end, and may be slid forward to engage with ratchet-teeth E', formed upon or attached to the hub of the wheel A, so that the attendant may drop a potato each time the end of the slide C' drops from a tooth, E'.

Several sets of ratchet-teeth may be formed upon the hub, so that by adjusting the slide C' the seed may be planted at any desired distance apart. The machine may be adjusted to plant two rows of potatoes at a time by providing each of the side bars of the frame S with a box, U, tube V, and seat W. The seed-box E is provided with a slide, F', which may be pushed forward to cover one or all of the cups F, as may be desired. G' is a bar, the forward edge of which is sharpened, and the ends of which are bent upward and are attached to the side bars of the frame S, so that as the machine is drawn forward the bar G' may cut up any weeds that may be growing upon the land. By removing the plows T the machine may be used for cutting up weeds when it is not desired to plant any seed. H' is the driver's seat, the standard I' of which is attached to the front bar of the frame D.

Having thus described my invention, I claim as new and desire to secure by Letters Patent—

1. The combination, with a wheeled vehicle, of a suspended frame, S, box U, tube V, and seat W, arranged with respect to each other, to enable potatoes to be planted by hand, as set forth.

2. An elastic hand-slide, C' D', arranged in a potato-planter, with respect to a hub-ratchet, as shown and described, so as to indicate the dropping-intervals or not, as the operator may desire.

HARVEY JUDSON ROBINSON.

Witnesses:
D. P. HATCH,
H. STODDARD.